(12) United States Patent
Matsuki et al.

(10) Patent No.: US 8,743,315 B2
(45) Date of Patent: Jun. 3, 2014

(54) SURFACE LIGHT SOURCE DEVICE, LIQUID CRYSTAL DISPLAY DEVICE, AND LENS

(75) Inventors: Daizaburo Matsuki, Osaka (JP); Tomoko Iiyama, Osaka (JP); Masahiro Kasano, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/203,851

(22) PCT Filed: Feb. 1, 2011

(86) PCT No.: PCT/JP2011/000539
§ 371 (c)(1),
(2), (4) Date: Aug. 30, 2011

(87) PCT Pub. No.: WO2011/096192
PCT Pub. Date: Aug. 11, 2011

(65) Prior Publication Data
US 2012/0287375 A1  Nov. 15, 2012

(30) Foreign Application Priority Data
Feb. 2, 2010 (JP) ................................ 2010-020863

(51) Int. Cl.
*G02F 1/1335* (2006.01)

(52) U.S. Cl.
USPC .............................. 349/62; 359/708; 362/335

(58) Field of Classification Search
None
See application file for complete search history.

(56) References Cited

U.S. PATENT DOCUMENTS 7,572,036 B2 * 8/2009 Yoon et al. .................... 362/331
8,147,100 B2 * 4/2012 Yamaguchi ............... 362/311.02

(Continued)

FOREIGN PATENT DOCUMENTS

| CN | 201306673 Y | 9/2009 |
|---|---|---|
| JP | 2005-203156 A | 7/2005 |
| JP | 2006-092983 | 4/2006 |
| JP | 2006-293274 A | 10/2006 |
| JP | 3875247 B2 | 11/2006 |
| JP | 2007-173322 A | 7/2007 |
| JP | 2008-166250 A | 7/2008 |
| JP | 2008-305923 A | 12/2008 |
| JP | 4266837 B2 | 2/2009 |
| JP | 2009-152142 A | 7/2009 |
| JP | 2009-524027 A | 11/2009 |
| JP | 2009-542017 A | 11/2009 |
| JP | 2010-015898 A | 1/2010 |
| WO | WO 2008/000244 A2 | 1/2008 |

OTHER PUBLICATIONS

Japanese International Search Report for Application No. PCT/JP2011/000539, Mar. 1, 2011, Panasonic Corporation.

*Primary Examiner* — Richard Kim
(74) *Attorney, Agent, or Firm* — McDermott Will & Emery LLP

(57) ABSTRACT

The present invention relates to a surface light source, including a light source section made up of plural light emitting diodes and lenses that expand light from these light emitting diodes. The lens in the light source section has a light incident surface on which light from the light emitting diode is incident with an optical axis at a center, and a light exit surface that expands and emits the incident light. The light incident surface has a continued depressed surface, while the light exit surface has a continued projected surface. The lens performs such that "sag Y" decreases from a maximum value "sag $Y_0$" with an increment of "θi", where θi is an angle included between a straight line, connecting an arbitrary point on the light exit surface and a base point on the optical axis which corresponds to a position of the light emitting diode, and the optical axis; sag Y is a distance measured in a light axis direction from the base point on the optical axis to the arbitrary point on the light exit surface; and "sag $Y_0$" is a value of sag Y when angle θi is 0 (zero) degree, and wherein the light exit surface except a vicinity of the optical axis takes a shape satisfying a relation of 10 degrees<θmin<30 degrees, where θi takes a minimum value, i.e. θmin when curvature C of a micro-section on the light exit surface in a sectional view which includes the optical axis takes a minimum value.

17 Claims, 15 Drawing Sheets

(56) References Cited

U.S. PATENT DOCUMENTS

| | | |
|---|---|---|
| 2006/0227431 A1 | 10/2006 | Yoon et al. |
| 2007/0091615 A1 | 4/2007 | Hsieh et al. |
| 2007/0268722 A1 | 11/2007 | Ohkawa |
| 2008/0100773 A1 | 5/2008 | Hwang et al. |
| 2008/0158875 A1 | 7/2008 | Kim et al. |
| 2008/0278944 A1* | 11/2008 | Yoon et al. .................... 362/244 |
| 2009/0225256 A1* | 9/2009 | Kim ................................ 349/64 |
| 2009/0273394 A1 | 11/2009 | Kleider et al. |
| 2009/0284951 A1 | 11/2009 | Muschaweck |
| 2009/0296405 A1 | 12/2009 | Tetsuo |

\* cited by examiner

SURFACE LIGHT SOURCE DEVICE, LIQUID CRYSTAL DISPLAY DEVICE, AND LENS

This Application is a U.S. National Phase Application of PCT International Application PCT/JP2011/000539.

TECHNICAL FIELD

The present invention relates to a surface light source device using a lens that widens directivity of a light source such as a light emitting diode, a liquid crystal display device, and a lens.

BACKGROUND ART

In a surface light source device of a conventional large-sized liquid crystal display device, a large number of cold-cathode tubes have been arranged immediately under a liquid crystal panel, and these cold-cathode tubes have been used along with members such as a diffusion panel and a reflection sheet. In recent years, the light emitting diode has been used as a light source of the surface light source device. The light emitting diode has recently been improved in efficiency, and expected as a light source with small consumption power to replace a fluorescent. Further, as for the light source for a liquid crystal display device, the brightness of the light emitting diode can be controlled in accordance with a picture, thereby to reduce power consumption of the liquid crystal display device.

In the surface light source device using the light emitting diode of the liquid crystal display device as the light source, a large number of light emitting diodes are arranged in place of the cold-cathode tubes. Although the use of the large number of light emitting diodes can give uniform brightness on the surface of the surface light source device, there has been a problem in that the device cannot be made inexpensive due to the need for the large number of light emitting diodes. An attempt has been made to increase an output of one light emitting diode to reduce the number of light emitting diodes to be used, and for example in Patent Document 1, there is proposed a lens with which a uniform surface light source is obtained even by means of a small number of light emitting diodes.

In order to obtain a uniform light source by means of the small number of light emitting diodes, it is necessary to increase an illuminated area illuminated by one light emitting diode. That is, it is necessary to expand light from the light emitting diode, to widen the directivity thereof. Therefore, in Patent Document 1, a lens having a circular shape in a plan view, which controls directivity of a chip-like light emitting diode, is arranged above the light emitting diode. This lens is shaped such that a portion in the vicinity of an optical axis on a light exit surface that emits light is a depressed surface, and a portion on the outside thereof is a projected surface continued with the depressed surface.

The light emitting diode emits the largest amount of light in a direction to the front surface of the chip of the light emitting diode. In the lens disclosed in Patent Document 1, light headed in the direction from the light source to the front surface is diffused by refraction on the depressed surface in the vicinity of the optical axis. This can suppress an illuminance in the vicinity of the optical axis on a surface to be irradiated, so as to give an expanded illuminance distribution.

PRIOR ART DOCUMENT

Patent Document

Patent Document 1; Japanese Patent No. 3875247

DISCLOSURE OF THE INVENTION

The surface light source device of the present invention relates to a surface light source, including a light source section made up of a plurality of light emitting diodes and lenses that expand light from these light emitting diodes.

The lens in the light source section has a light incident surface on which light from the light emitting diode is incident with an optical axis at a center, and a light exit surface that expands and emits the incident light, and the light incident surface has a continued depressed surface, while the light exit surface has a continued projected surface. The lens performs such that "sag Y" decreases from a maximum value "sag $Y_0$" with an increment of "$\theta i$", where $\theta i$ is an angle included between a straight line, connecting an arbitrary point on the light exit surface and a base point on the optical axis which corresponds to a position of the light emitting diode, and the optical axis; sag Y is a distance measured in a light axis direction from the base point on the optical axis to the arbitrary point on the light exit surface; and "sag $Y_0$" is a value of sag Y when angle $\theta i$ is 0 (zero) degree. The light exit surface except a vicinity of the optical axis takes a shape satisfying a relation of 10 degrees<$\theta$min<30 degrees, where $\theta i$ takes a minimum value, i.e. $\theta$min when curvature C of a micro-section on the light exit surface in a sectional view which includes the optical axis takes a minimum value.

Moreover, a liquid crystal display device of the present invention includes: a liquid crystal display panel, and a surface light source device which is arranged on a back surface side of this liquid crystal display panel and has a size corresponding to the liquid crystal display panel, and in which the surface light source device includes: a light source section made up of a plurality of light emitting diodes, and lenses that expand light from these light emitting diode; a housing that accommodates this light source section; a diffusion panel arranged between the liquid crystal display panel and the light source; and a reflection sheet that allows light, emitted from the light source section, to be reflected to the diffusion panel side, wherein the light source section is configured such that plural lenses are arranged by being arrayed in a central section, the lens in the light source section has a light incident surface on which light from the light emitting diode is incident with an optical axis at a center, and a light exit surface that expands and emits the incident light, the light incident surface has a continued depressed surface, while the light exit surface has a continued projected surface. The lens performs such that "sag Y" decreases from a maximum value "sag $Y_0$" with an increment of "$\theta i$", where $\theta i$ is an angle included between a straight line, connecting an arbitrary point on the light exit surface and a base point on the optical axis which corresponds to a position of the light emitting diode, and the optical axis; sag Y is a distance measured in a light axis direction from the base point on the optical axis to the arbitrary point on the light exit surface; and "sag $Y_0$" is a value of sag Y when angle $\theta i$ is 0 (zero) degree. The light exit surface except a vicinity of the optical axis takes a shape satisfying a relation of 10 degrees<$\theta$min<30 degrees, where $\theta i$ takes a minimum value, i.e.$\theta$min when curvature C of a micro-section on the light exit surface in a sectional view which includes the optical axis takes a minimum value.

Further, a lens of the present invention is a lens that expands light from a light emitting diode, wherein the lens has a light incident surface on which light from the light emitting diode is incident with an optical axis at a center, and a light exit surface that expands and emits the incident light, the light incident surface has a continued depressed surface, while the light exit surface has a continued projected surface. The lens performs such that "sag Y" decreases from a maximum value "sag $Y_0$" with an increment of "$\theta i$", where $\theta i$ is an angle included between a straight line, connecting an arbitrary point on the light exit surface and a base point on the optical axis which corresponds to a position of the light emitting diode, and the optical axis; sag Y is a distance measured in a light axis direction from the base point on the optical axis to the arbitrary point on the light exit surface; and "sag $Y_0$" is a value of sag Y when angle $\theta i$ is 0 (zero) degree. The light exit surface except a vicinity of the optical axis takes a shape satisfying a relation of 10 degrees<$\theta$min<30 degrees, where $\theta i$ takes a minimum value, i.e. $\theta$min when curvature C of a micro-section on the light exit surface in a sectional view which includes the optical axis takes a minimum value.

PREFERRED EMBODIMENTS FOR CARRYING OUT OF THE INVENTION

In the following, a surface light source device and a liquid crystal display device using the surface light source device are described with reference to the drawings.

Figure 1:
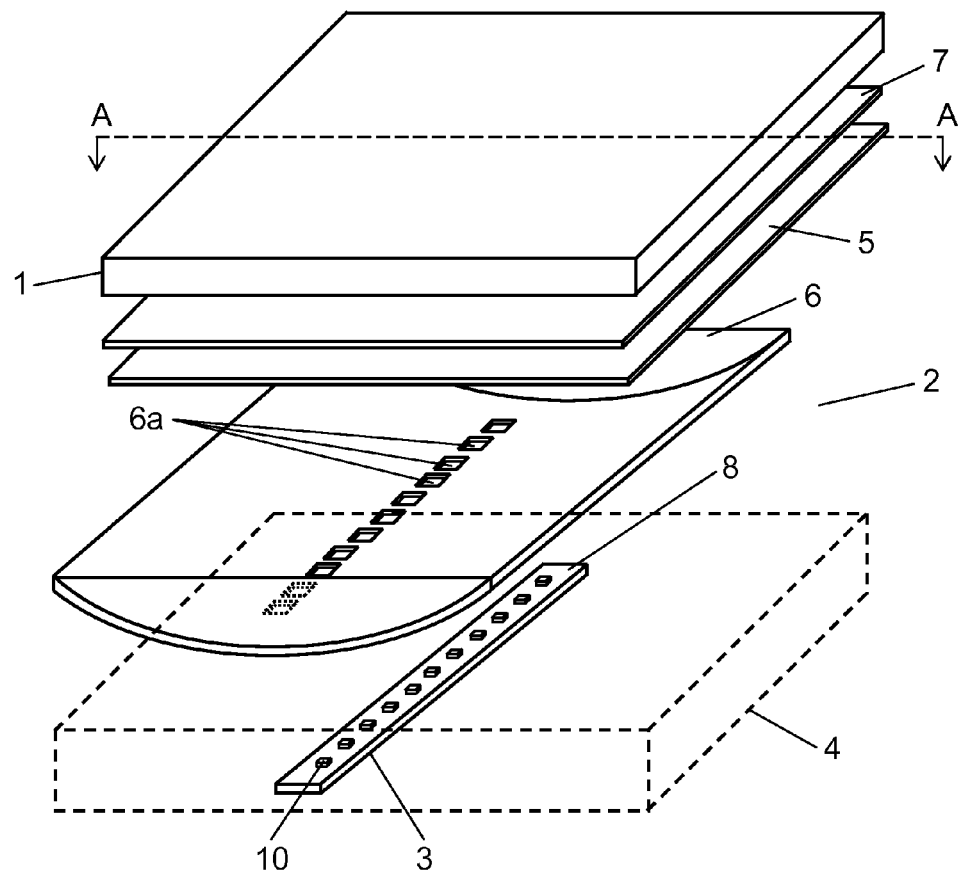
FIG. 1 is an exploded perspective view showing a schematic configuration of the whole of a liquid crystal display device using a surface light source device according to an embodiment.
Figure 2:
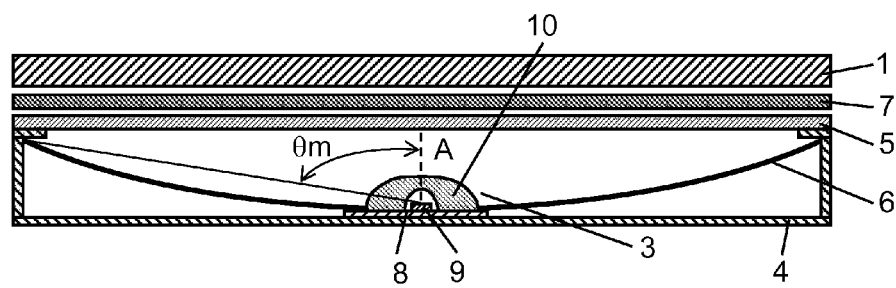
FIG. 2 is a sectional view cut along line A-A of FIG. 1.

FIG. 1 is an exploded perspective view showing a schematic configuration of the whole of a liquid crystal display device using a surface light source device according to an embodiment, and FIG. 2 is a sectional view cut along line A-A of FIG. 1.

As shown in FIGS. 1 and 2, the liquid crystal display device is made up of transmission liquid crystal display panel 1 in the shape of a rectangular flat plate, and surface light source device 2 in a rectangular parallelepiped shape which is arranged on a back surface side of this liquid crystal display panel 1 and has a size corresponding to liquid crystal display panel 1.

Surface light source device 2 includes: light source section 3 linearly arranged along a direction of a long side of liquid crystal display panel 1 so as to be opposed to a central section of liquid crystal display panel 1; housing 4 in a rectangular parallelepiped shape which accommodates this light source section 3; diffusion panel 5 arranged so as to cover an opening of this housing 4, and also arranged between liquid crystal display panel 1 and light source section 3; and reflection sheet 6 that allows light, emitted from light source section 3, to be reflected to liquid crystal display panel 1 side, namely diffusion panel 5 side.

Diffusion panel 5 includes, on the front surface side thereof in a place between itself and liquid crystal display panel 1, optical sheet laminated body 7 having a size corresponding to liquid crystal display panel 1. This optical sheet laminated body 7 is, for example, made up of a prism sheet which collects incident light from diffusion panel 5 toward liquid crystal display panel 1 side located ahead, a diffusion sheet which further diffuses the incident light from diffusion panel 5, a polarization sheet which allows light, having a specific plane of polarization, to pass therethrough such that a plane of polarization of the incident light corresponds to a plane of polarization of liquid crystal display panel 1, and some other sheet. Further, in the present embodiment, light source section 3 is linearly arranged so as to be opposed to the central section of liquid crystal display panel 1, thereby to be arranged only in an almost central section of surface light source device 2.

Figure 3:
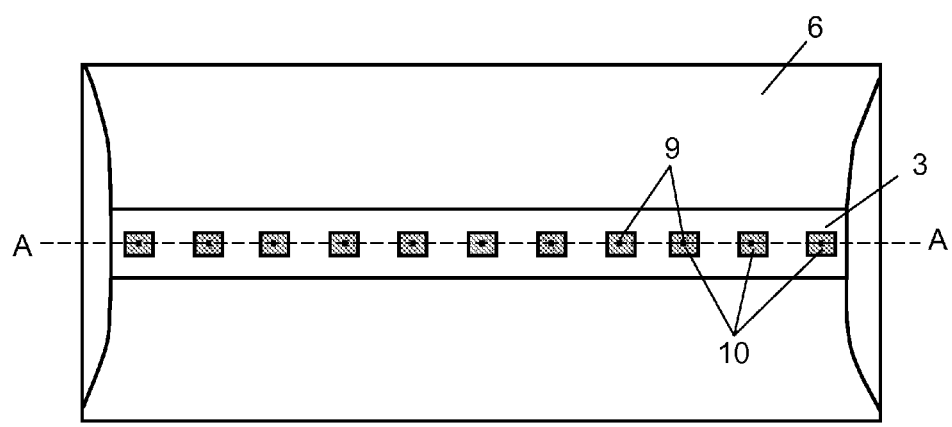
FIG. 3 is a plan view showing a light source section of the surface light source device.
Figure 4:
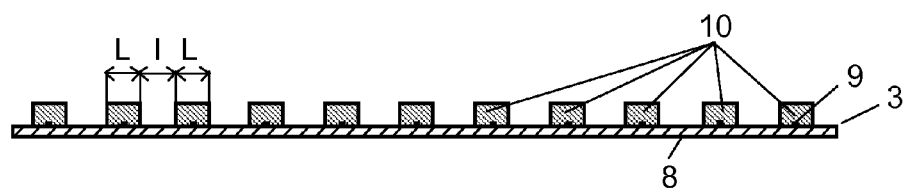
FIG. 4 is a sectional view cut along line A-A of FIG. 3.

FIG. 3 is a plan view showing the light source section of the surface light source device, and FIG. 4 is a sectional view cut along line A-A of FIG. 3.

Light source section 3 is configured such that plural light emitting diodes 9 are mounted at predetermined intervals on the front surface of reed-shaped insulating substrate 8, which is formed with a predetermined wiring pattern on the back surface side thereof, and in association with those individual light emitting diodes 9, plural lenses 10 in almost semi-cylindrical shape, each obtained by cutting a cylindrical column into halves in a long axial direction, are arranged so as to cover light emitting diodes 9. It is to be noted that, although not shown, light emitting diode 9 is covered with a sealing resin, such as an epoxy resin or silicon rubber, in order not to come into contact with air.

Lens 10 is one which expands light from light emitting diode 9 as the light source and irradiates an object to be irradiated with the light, and is made up of a transparent material having a refractive index of the order of 1.4 to 2.0, for example. As the transparent material constituting lens 10, there can be used a resin such as an epoxy resin, a silicon resin, an acrylic resin or polycarbonate, glass, or rubber such as silicon rubber. Among them, the epoxy resin, the silicon rubber or the like, which is used as the sealing resin for light emitting diode 9, is preferably used.

Figure 5:
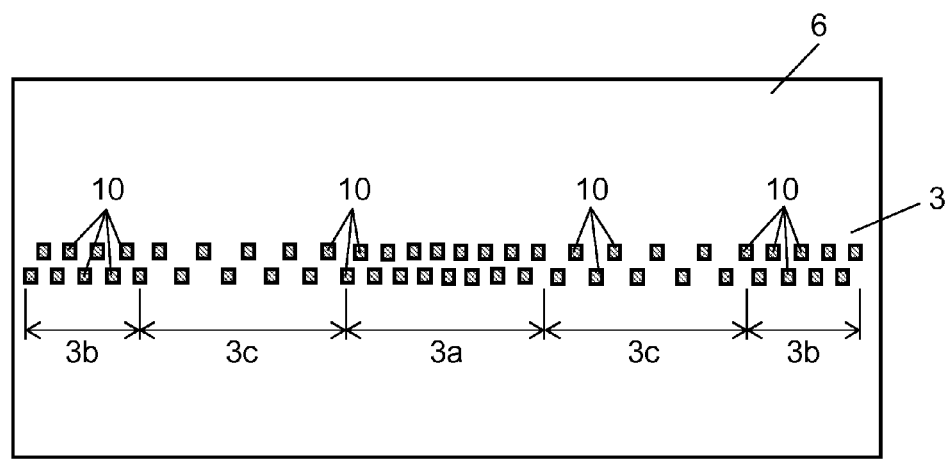
FIG. 5 is a plan view showing an example of an array of lenses.

In the present embodiment, as shown in FIG. 5, plural light emitting diodes 9 and plural lenses 10 are arranged in plural rows, so as to be arrayed at least in two rows, thereby constituting light source section 3. It should be noted that, although plural lenses 10 in light source section 3 are arrayed in a staggered form in the adjacent rows in the example shown in FIG. 5, the lenses may not be arrayed in the staggered form, but may be arrayed so as to be located at the same positions in the adjacent rows. Further, the number of rows of the array may be at least two, and may also be three or four.

As thus described, in surface light source device 2, light source section 3 is configured by plural light emitting diodes 9 and plural lenses 10 being linearly arranged in a central section, and brightness distributions by the respective lens rows alternately overlap due to plural light emitting diodes 9 and plural lenses 10 having been arranged so as to be arrayed at least in two rows, so that the nonuniformity of the brightness distribution can be reduced.

Herein, as shown in FIG. 4, in the embodiment, the arrangement of light source section 3 is made such that a relation between length L of lens 10 in an array direction and interval I between adjacent lenses 10 is: L<I, and intervals I between lenses 10 are almost uniform. With such a configuration formed, it is possible to ensure sufficient brightness as surface light source device 2, and further to configure light source section 3 of a small number of lenses 10, so as to inexpensively configure the device.

Incidentally, as shown in FIGS. 1 and 2, in the case of constituting light source section 3 by linear arrangement in a row so as to be opposed to the central section of liquid crystal display panel 1, according to experimental verification performed by the present inventors, light emitted from diffusion panel 5 is small in amount at the end of surface light source device 2, and sufficient brightness is thus difficult to ensure. In such a case, light emitting diode 9 with a large output may be used, but it may lead to a price increase. Meanwhile, it is required as the liquid crystal display device that a central section of a screen be brighter than a peripheral section thereof.

In the present embodiment, as shown in FIG. 5, in plural lenses 10, individual lenses 10 in the central section are arranged with narrowed intervals and thus more densely than in the other sections, to change the arrangement intervals of the individual light sources in light source section 3, whereby it is possible to provide a surface light source which totally emits light with uniform brightness, and also satisfy the requirement in terms of brightness of the screen of the liquid crystal display device.

That is, as shown in FIG. 5, in light source section 3 of the present embodiment, individual lenses 10 in central section 3a and peripheral section 3b are arranged densely with narrowed arrangement intervals, and individual lenses 10 in intermediate section 3c between central section 3a and peripheral section 3b are arranged such that arrangement intervals between individual lenses 10 are wide as compared with in central section 3a and peripheral section 3b. Further, on a boundary between central section 3a and intermediate section 3c and a boundary between intermediate section 3c and peripheral section 3b, lenses 10 are arranged such that the interval between lenses 10 gradually changes.

Next, the configuration of lens 10 in light source section 3 is described in more detail.

Figure 6:
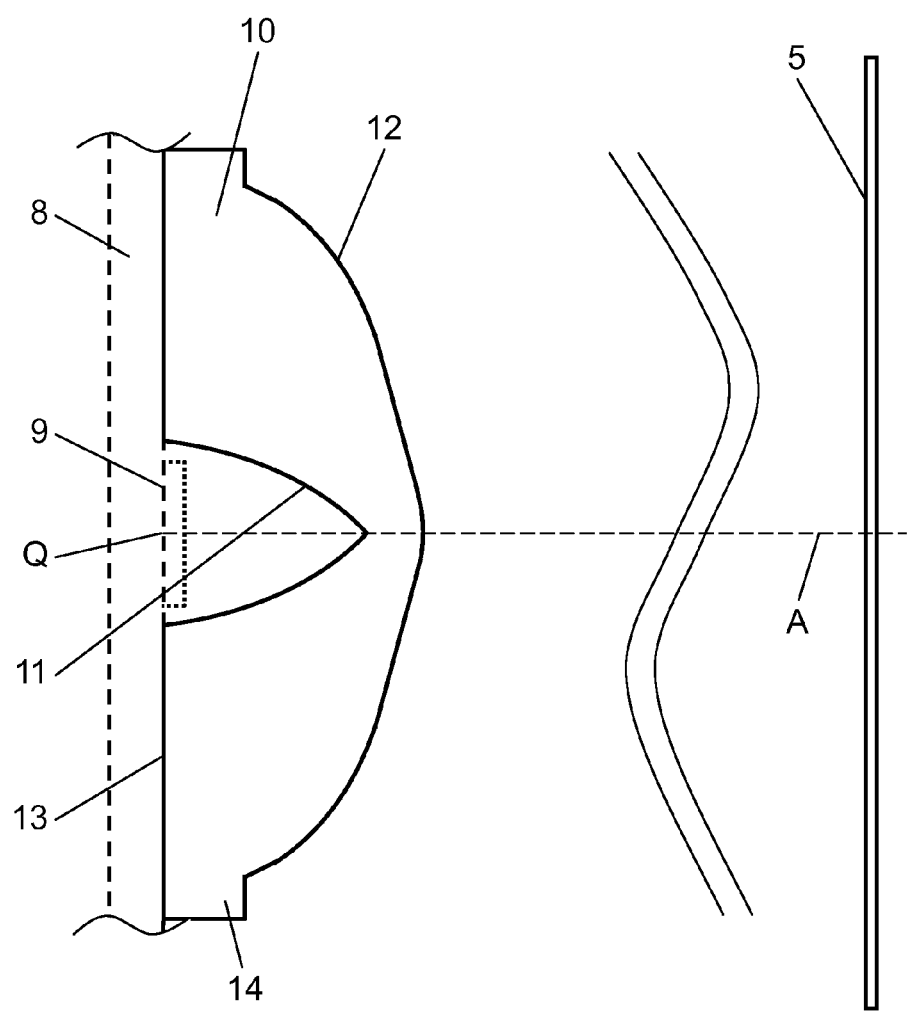
FIG. 6 is a constitutional view of the lens.
Figure 7:
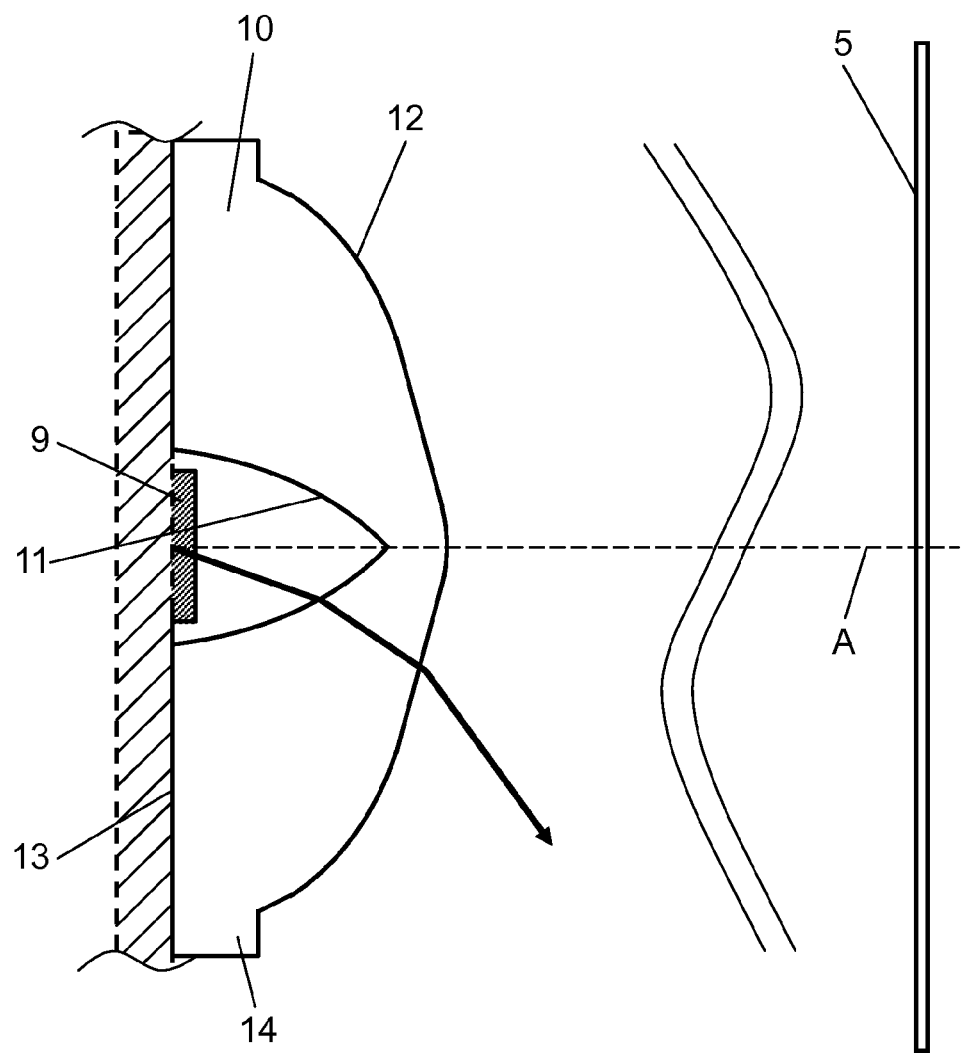
FIG. 7 is an explanatory view explaining an optical path of light in the lens.

FIG. 6 is a constitutional view of the lens, and FIG. 7 is a view showing an optical path of lens 10 shown in FIG. 6.

Illuminating lens 10 is one which is arranged between light emitting diode 9 as the light source having directivity and diffusion panel 5 as the surface to be irradiated, and expands light from the light source and irradiates the surface to be irradiated with the light. That is, the directivity of the light source is widened by lens 10. The illuminance distribution of the surface to be irradiated is maximal on optical axis A as a central line in designing of lens 10, and substantially monotonously decreases as getting closer to the periphery. It is to be noted that the light source and lens 10 are arranged such that optical axes of both agree with each other.

Specifically, lens 10 has light incident surface 11 on which light from the light source is incident, and light exit surface 12 which emits the incident light. Further, lens 10 has ring-shaped bottom surface 13, facing the opposite side to light exit surface 12, around light incident surface 11. Further, in the present embodiment, ring section 14 protruding outward in a radius direction is provided between light exit surface 12 and bottom surface 13, and on a substantially U-shaped outer surface in cross section of this ring section 14, an edge of light exit surface 12 and an outer edge of bottom surface 13 are connected with each other. However, ring section 14 can be omitted, and the edge of light exit surface 12 and the outer edge of bottom surface 13 may be connected with each other on a linear or circular end surface in cross section.

Light emitting diode 9 is arranged in proximity to light incident surface 11 of lens 10. Light incident surface 11 of lens 10 has preferably been widened so as to exceed the light emitting surface of light emitting diode 9 in an optical axis direction, in order to deal with variations in height of the light emitting surface of light emitting diode 9. In the present embodiment, the surface of light emitting diode 9 which is on the opposite side to the light emitting surface is located on the same plane as bottom surface 13 of the illuminating lens, and an intersection point between the surface of light emitting diode 9 on the opposite side to the light emitting surface (i.e. surface of substrate 8 on which light emitting diode 9 is mounted) and optical axis A is base point Q. Light emitted from light exit surface 12 of lens 10 reaches the surface to be irradiated, to illuminate the surface to be irradiated.

Although light emission within light emitting diode 9 is light emission having no directivity, a refractive index of a light emission area is not smaller than 2.0, and when light intrudes into an area with a low refractive index, a light intensity is maximal in a direction of a normal of the interface due to an influence of refraction of the interface, and the light intensity becomes smaller with an increase in angle from the normal direction. As thus described, light emitting diode 9 has the directivity, and for illuminating a large area, it is necessary to widen the directivity with lens 10. It should be noted that forming a dorm-shaped sealing section of a sealing resin on the light emitting surface of light emitting diode 9 can further widen the directivity as the light source, and can also enhance efficiency in extraction of light.

Light incident surface 11 of lens 10 is a continued depressed surface. Light incident surface 11 is preferably rotationally symmetric with respect to optical axis A, but it may not be rotationally symmetric with respect to optical axis A. For example, when the light source is rectangular as seen from the optical axis direction, light incident surface 11 may be elliptical extending in the same direction as the light source as seen from the light axis direction. Bottom surface 13 surrounding light incident surface 11 is flat in the present embodiment.

Further, light exit surface 12 is preferably a continued projected surface and rotationally symmetric with respect to optical axis A, but it may not be rotationally symmetric with respect to optical axis A. For example, when the light source is rectangular as seen from the optical axis direction, light exit surface 12 may be elliptical extending in the same direction as the light source as seen from the light axis direction. In the present embodiment, light exit surface 12 is rotationally symmetric with respect to optical axis A. A curvature of a central portion of light exit surface 12 is preferably substantially zero. Herein, the "central portion" refers to an area within a predetermined radius from optical axis A (e.g. 1/10 of a radius (effective radius) of an outermost periphery of light exit surface 12 as seen from the light axis direction), and when a distance measured in the light axis direction from base point Q on optical axis A to an arbitrary point on light exit surface 12 is sag amount (sagY), being "substantively zero" refers to that a difference between a maximal sag amount and a minimal sag amount in the central portion is not larger than 0.1 mm. Such a configuration facilitates shaping, to allow production of lens 10 resistant to tolerance.

It is to be noted that an outline of lens 10 in a plan view is not necessarily rotationally symmetric with respect to optical axis A. For example, a pair of flat sections in parallel with each other with optical axis interposed therebetween may be provided in ring section 14, and lens 10 may be in an oval shape as seen from the light axis direction.

FIG. 7 shows an optical path of a light beam which is emitted from the vicinity of optical axis A of light emitting diode 9 and reaches light incident surface 11 of lens 10. Light having emitted from light emitting diode 9 passes through light incident surface 11 of lens 10, while being refracted in a direction away from optical axis A, and then reaches light exit surface 12. The light having reached passes through light exit surface 12 while being refracted, and then reaches a wide area of the surface to be irradiated.

Herein, in lens 10, when an angle formed by a straight line, connecting an arbitrary point on light exit surface 12 and base point Q on optical axis A, with optical axis A is θi, when a distance measured in the light axis direction from the base point on optical axis A to the arbitrary point on light exit surface 12 is sagY, and when sagY is sagY$_0$ at the time of θi being 0°, sagY monotonously decreases with sagY$_0$ being maximal, and light exit surface 12 is preferably formed in such a shape that, when θi is θmin at the time when a curvature C of a micro-section on light exit surface 12 is minimal, θmin satisfies Formula (1) below, except for the vicinity of optical axis A. It should be noted that the "vicinity of optical axis A" refers to an area within a predetermined angle (e.g. θi=2°) from optical axis A.

$$10° < θmin < 30° \quad (1)$$

As for light exit surface 12 of lens 10, satisfying the condition of Formula (1) leads to a change in size of light emitting diode 9, thereby to reduce Fresnel reflection components that simultaneously fluctuate. On the other hand, when the lower limit of Formula (1) is exceeded, the foregoing Fresnel reflection component becomes more likely to be generated, and when the upper limit is exceeded, the size (e.g. length in the light axis direction) of lens 10 becomes excessively large.

Figure 8:
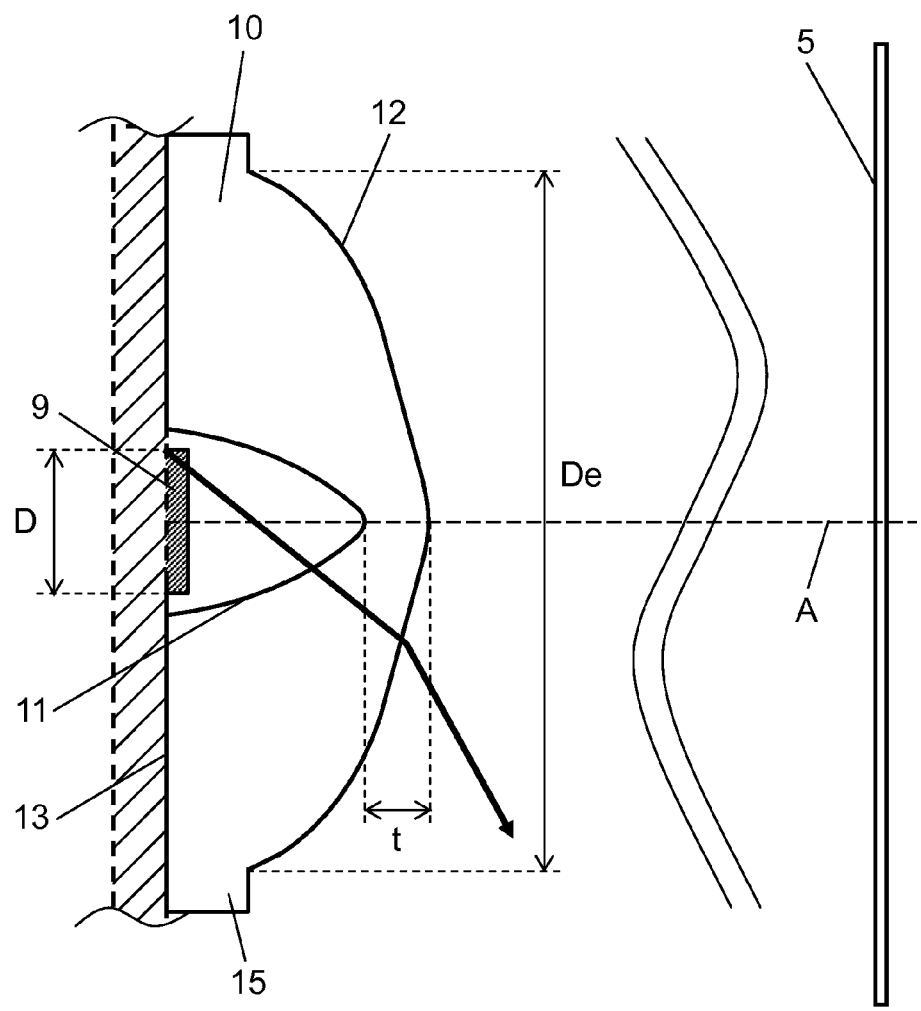
FIG. 8 is an explanatory view explaining an optical path of light in the lens.

FIG. 8 shows an optical path of a light ray which is emitted with a large angle with respect to optical axis A from near the end of light emitting diode 9 and reaches light incident surface 11. Light emitted from light emitting diode 9 passes through light incident surface 11 while being refracted, and then reaches light exit surface 12. The light having reached passes through light exit surface 12 while being refracted, and then reaches the surface to be irradiated. In FIG. 8, when a maximal width of the light emitting surface of light emitting diode 9 is D and a central thickness of lens 10 is t, Formula (2) below is preferably satisfied.

$$0.3 < D/t < 3.0 \quad (2)$$

Satisfying such a condition leads to a change in size of light emitting diode 9, thereby to reduce Fresnel reflection components that fluctuate. On the other hand, when the lower limit of Formula (2) is exceeded, the size (e.g. length in the light axis direction) of lens 10 becomes large and when the upper limit is exceeded, the foregoing Fresnel reflection component becomes more likely to be generated Further, when the maximal width of the light emitting surface of light emitting diode 9 is D and an effective radius of lens 10 is De, Formula (3) below is preferably satisfied.

$$0.03 < D/De < 0.3 \quad (3)$$

Satisfying such a condition leads to a change in size of light emitting diode 9, thereby to reduce Fresnel reflection components that simultaneously fluctuate. Further, when the lower limit of Formula (3) is exceeded, the size (e.g. length in a vertical direction to the light axis) of lens 10 becomes large and when the upper limit is exceeded, the foregoing Fresnel reflection component becomes more likely to be generated.

Incidentally, in the case of using lens 10 with light exit surface 12 being a depressed surface, light emitted from light emitting diode 9 passes through light incident surface 11 while being refracted, and then reaches light exit surface 12. Part of the light having reached is Fresnel reflected on light exit surface 12, and are refracted on bottom surface 13 of lens 10 and then headed for substrate 8. The light is diffused and reflected on substrate 8 and refracted again on bottom surface 13, passes through light exit surface 12 while being refracted, and then reaches the surface to be irradiated. In such a shape where the Fresnel reflection is likely to occur, an influence of the Fresnel reflection components changes with change in size of light emitting diode 9, leading to a large change in illuminance distribution on the surface to be irradiated, and hence the size of light emitting diode 9 is constrained.

As opposed to this, in lens 10 according to the present embodiment, the Fresnel reflection is unlikely to occur, and it is therefore possible to reduce the influence of the Fresnel reflection, so as to alleviate constraints on the size and shape of light emitting diode 9.

Next, specific examples are described.

Figure 9:
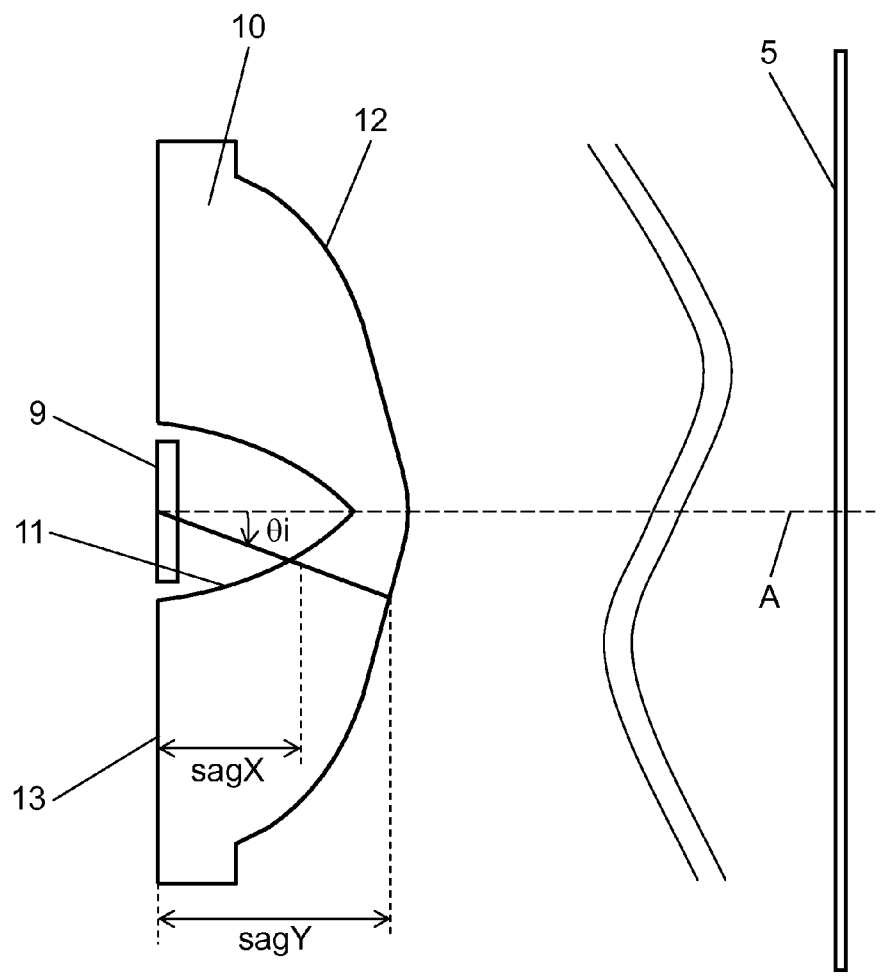
FIG. 9 is a constitutional view explaining a specific lens according to Example 1.
Figure 10:
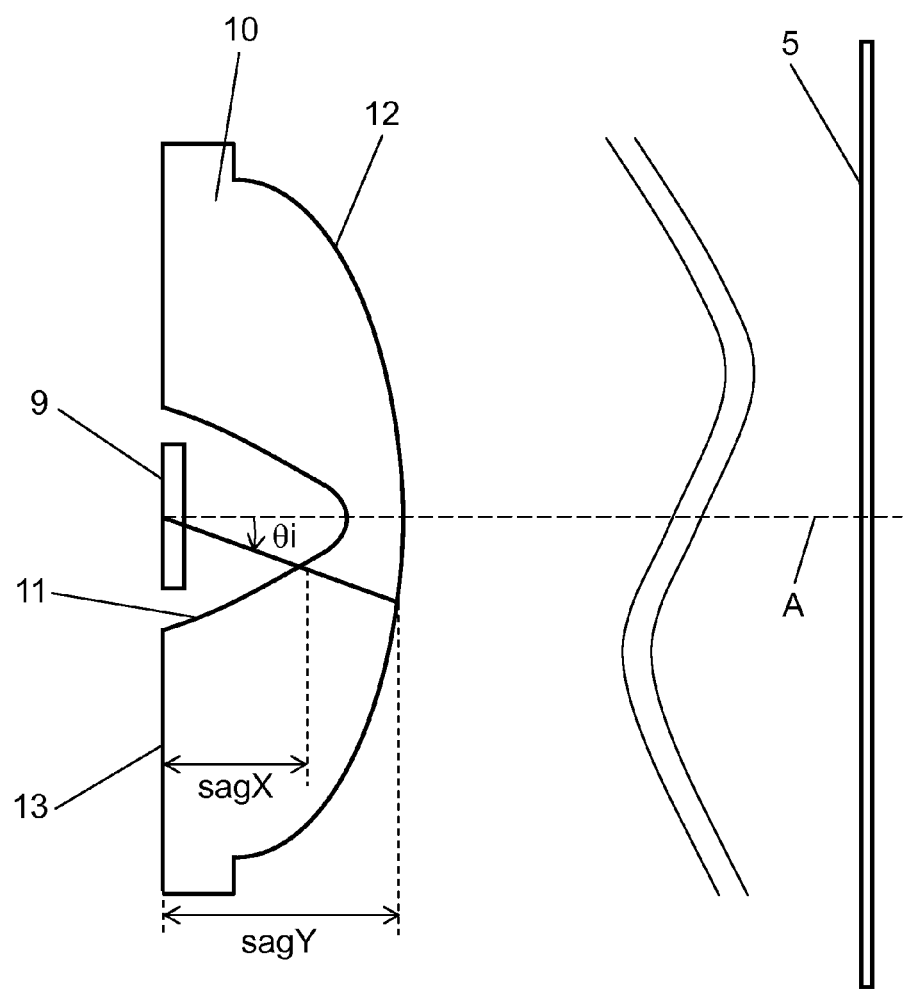
FIG. 10 is a constitutional view explaining a specific lens according to Example 2.

FIG. 9 is a constitutional view of lens 10 according to Example 1, and FIG. 10 is a constitutional view of lens 10 according to Example 2. These Examples 1, 2 are design examples using light emitting diode 9 of a general-purpose article as the light source, and aiming at expanding directivity. The light emitting surface of light emitting diode 9 in Examples 1, 2 has a size of 3.0×3.0 mm, for example. Other than this, for example, the light emitting surface may have a size of being as small as 1.0×1.0 mm, or may have a size of 3.0×1.0 mm and a rectangular shape, or the like.

In FIGS. 9 and 10, θi is an angle formed by optical axis A and a straight line, connecting base point Q on optical axis A and an arbitrary point on each of light incident surface 11 and light exit surface 12. sagX is a distance measured in the light axis direction from base point Q on optical axis A to the arbitrary point on light incident surface 11, and sagY is a distance measured in the light axis direction from base point Q on optical axis A to the arbitrary point on light exit surface 12.

First, specific numeral values of Example 1 are shown in Table 1.

TABLE 1

| θi | sagX | θi | sagY |
|---|---|---|---|
| 0 | 4.5 | 0 | 6 |
| 1.27552 | 4.4912 | 0.95487 | 5.99982 |
| 2.56484 | 4.4648 | 1.90958 | 5.99866 |

TABLE 1-continued

| θi | sagX | θi | sagY |
|---|---|---|---|
| 3.8822 | 4.4208 | 2.86444 | 5.99573 |
| 5.24278 | 4.3592 | 3.8201 | 5.99051 |
| 6.66324 | 4.28 | 4.77738 | 5.98266 |
| 8.16233 | 4.18319 | 5.73716 | 5.97203 |
| 9.76168 | 4.06879 | 6.70024 | 5.9586 |
| 11.4867 | 3.93679 | 7.66726 | 5.9425 |
| 13.368 | 3.78719 | 8.63868 | 5.92392 |
| 15.4425 | 3.61998 | 9.6147 | 5.90314 |
| 17.7559 | 3.43518 | 10.5953 | 5.88047 |
| 20.3648 | 3.23278 | 11.5802 | 5.85623 |
| 23.34 | 3.01277 | 12.5688 | 5.83076 |
| 26.7697 | 2.77517 | 13.5606 | 5.80437 |
| 30.7631 | 2.51996 | 14.5546 | 5.77736 |
| 35.4512 | 2.24716 | 15.5498 | 5.75002 |
| 40.9836 | 1.95675 | 16.5451 | 5.72256 |
|  |  | 17.5394 | 5.6952 |
|  |  | 18.5317 | 5.66809 |
|  |  | 19.5206 | 5.64136 |
|  |  | 20.5054 | 5.6151 |
|  |  | 21.4848 | 5.58936 |
|  |  | 22.4582 | 5.56417 |
|  |  | 23.4247 | 5.53951 |
|  |  | 24.3838 | 5.51536 |
|  |  | 25.335 | 5.49166 |
|  |  | 26.278 | 5.46833 |
|  |  | 27.2125 | 5.44529 |
|  |  | 28.1386 | 5.42243 |
|  |  | 29.0562 | 5.39965 |
|  |  | 29.9656 | 5.37682 |
|  |  | 30.8669 | 5.35383 |
|  |  | 31.7605 | 5.33055 |
|  |  | 32.6467 | 5.30689 |
|  |  | 33.526 | 5.28272 |
|  |  | 34.3986 | 5.25795 |
|  |  | 35.2649 | 5.23249 |
|  |  | 36.1254 | 5.20625 |
|  |  | 36.9804 | 5.17916 |
|  |  | 37.8301 | 5.15117 |
|  |  | 38.675 | 5.12222 |
|  |  | 39.5151 | 5.09226 |
|  |  | 40.3509 | 5.06126 |
|  |  | 41.1825 | 5.02917 |
|  |  | 42.0103 | 4.99596 |
|  |  | 42.8344 | 4.96157 |
|  |  | 43.6552 | 4.92597 |
|  |  | 44.4732 | 4.88909 |
|  |  | 45.2886 | 4.85088 |
|  |  | 46.1021 | 4.81125 |
|  |  | 46.9142 | 4.77012 |
|  |  | 47.7255 | 4.72741 |
|  |  | 48.5366 | 4.68302 |
|  |  | 49.3481 | 4.63684 |
|  |  | 50.1609 | 4.58879 |
|  |  | 50.9755 | 4.53876 |
|  |  | 51.7926 | 4.48664 |
|  |  | 52.6129 | 4.43236 |
|  |  | 53.4371 | 4.3758 |
|  |  | 54.2657 | 4.31688 |
|  |  | 55.0996 | 4.25549 |
|  |  | 55.9394 | 4.1915 |
|  |  | 56.7862 | 4.12478 |
|  |  | 57.6409 | 4.05516 |
|  |  | 58.5049 | 3.98244 |
|  |  | 59.3796 | 3.9064 |
|  |  | 60.2667 | 3.82678 |
|  |  | 61.168 | 3.74328 |
|  |  | 62.0853 | 3.65562 |
|  |  | 63.0206 | 3.56352 |
|  |  | 63.9753 | 3.46669 |

Figure 11:
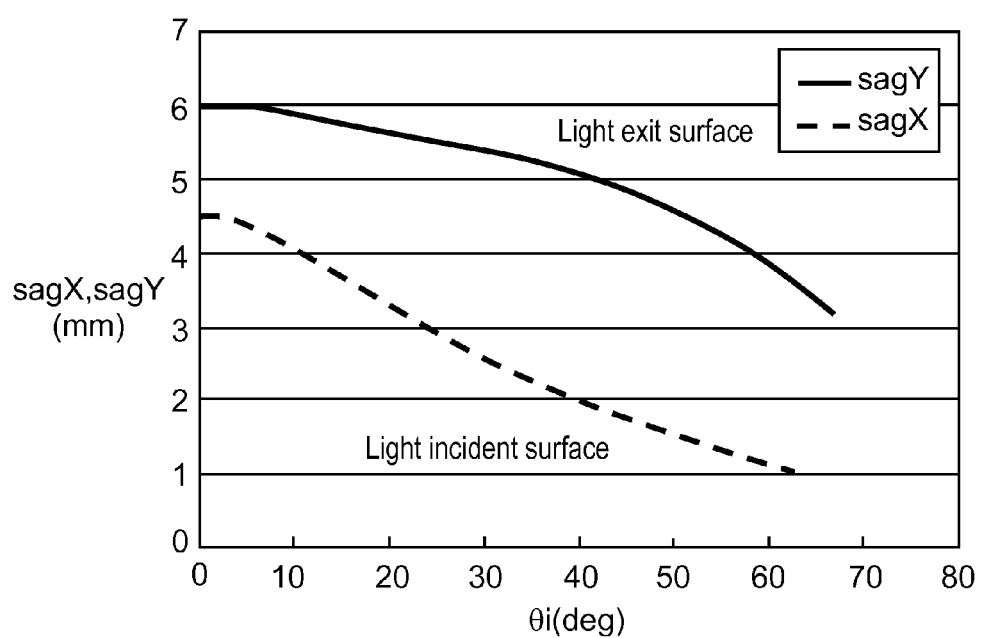
FIG. 11 is a graph showing relations between $\theta i$ and sagX/Y in the lens of Example 1.

FIG. 11 is graphic representation of θi, sagX and sagY of Table 1, showing that sagY monotonously decreases with $sagY_0$ being maximal.

Figure 12:
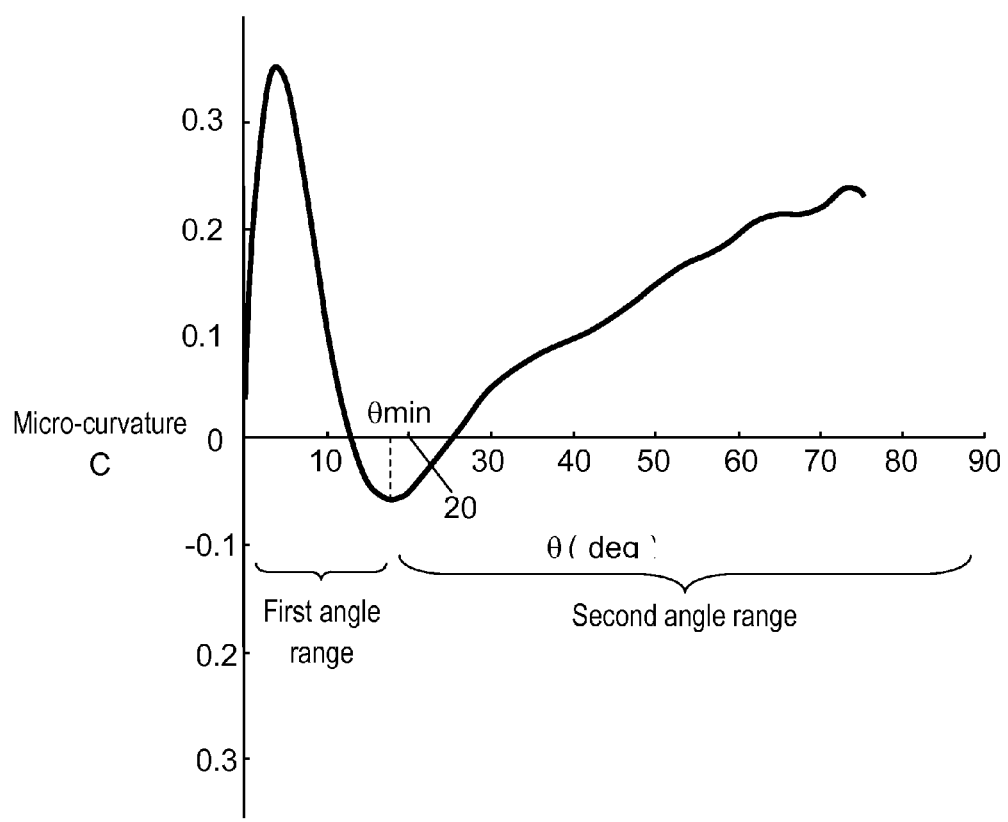
FIG. 12 is a graph showing a relation between $\theta i$ and micro-curvature C in the lens of Example 1.

Further, FIG. 12 is a graph showing a relation between θi and curvature C of the micro-section on light exit surface 12, and shows that θmin of lens 10 in Example 1 is in the range of Formula (1) above. Moreover, the figure shows that curvature C of the micro-section is maximal in a range (first angle range) from 0° to θmin.

Figure 15A:
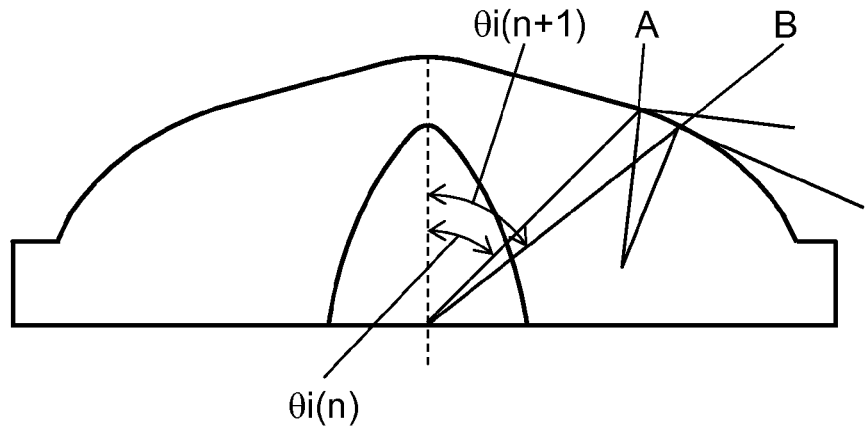
FIG. 15A is an explanatory view for explaining an optical path of the lens.
Figure 15B:
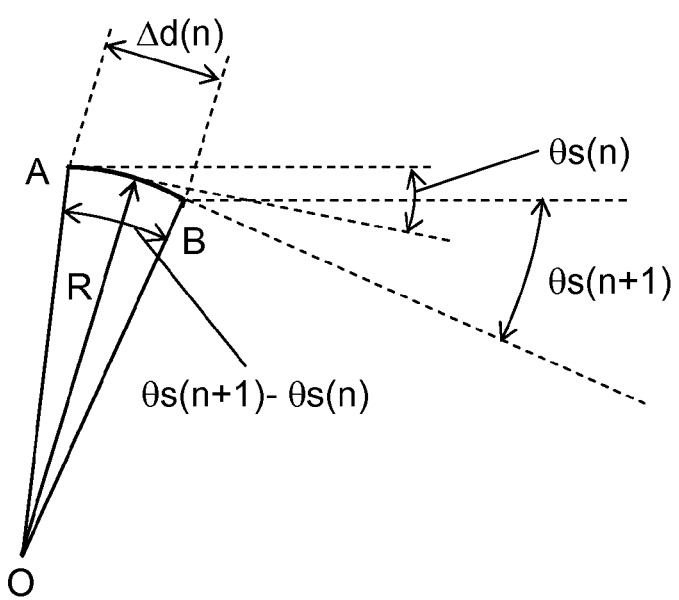
FIG. 15B is an explanatory view for explaining an optical path of the lens.

Herein, a calculating method for "curvature C of the micro-section" is described with reference to FIG. 15. As shown in FIGS. 15A, 15B, an n-th micro-section from the optical axis between point A and point B on light exit surface 12 is considered, and an angle formed by a line, connecting point A and the light source, with respect to the optical axis is θi(n), and an angle formed by a line, connecting point B and the light source, with respect to the optical axis is θi(n+1), where "θi(n+1)−θi(n)" is on the order of 0.1°. Further, an angle between a tangent line to point A on light exit surface 12 and a plane vertical to the optical axis is θs(n), and an angle between a tangent line to point B and a plane vertical to the optical axis is θs(n+1). Moreover, a length between point A and point B is Δd(n). Moreover, assuming that an interval between point A and point B is sufficiently small and thus made up of a single curvature radius R, center O of R is where a normal at point A and a normal at point B intersect with each other, and an angle ∠AOB formed by the two normal is expressed by: θs(n+1)−θs(n). With O taken at a center, radius R of an arc between point A and point B is expressed by: Δd(n)/(θs(n+1)−θs(n)). Curvature C is 1/R.

Therefore, curvature C of the n-th micro-section is: (θs(n+1)−θs(n))/Δd(n), where θs(n) and θs(n+1) are calculated by means of radian. Further, in the above definition, a sign of curvature C is positive when curvature center O is located on the closer side to the light source than light exit surface 12, and the sign is negative when curvature center O is located on the opposite side to the above.

Next, specific numeral values of Example 2 are shown in Table 2.

TABLE 2

| θi | sagX | θi | sagY |
|---|---|---|---|
| 0 | 5.75 | 0 | 7.25 |
| 0.997488 | 5.74342 | 0.790247 | 7.2499 |
| 2.00123 | 5.72373 | 1.58032 | 7.2493 |
| 3.01753 | 5.69102 | 2.37021 | 7.24784 |
| 4.05283 | 5.64546 | 3.15997 | 7.24534 |
| 5.11373 | 5.58727 | 3.94969 | 7.24171 |
| 6.20709 | 5.51674 | 4.73942 | 7.23696 |
| 7.34008 | 5.43419 | 5.52918 | 7.23118 |
| 8.52026 | 5.34001 | 6.3189 | 7.22446 |
| 9.75568 | 5.23458 | 7.10845 | 7.21695 |
| 11.0549 | 5.11835 | 7.89766 | 7.20877 |
| 12.4272 | 4.99177 | 8.68629 | 7.20005 |
| 13.8826 | 4.8553 | 9.47407 | 7.19091 |
| 15.4318 | 4.7094 | 10.2607 | 7.18142 |
| 17.0867 | 4.55455 | 11.0459 | 7.17167 |
| 18.8597 | 4.39121 | 11.8294 | 7.1617 |
| 20.7648 | 4.21983 | 12.611 | 7.15155 |
| 22.8166 | 4.04086 | 13.3903 | 7.14124 |
| 25.0306 | 3.85474 | 14.1671 | 7.13077 |
| 27.4231 | 3.66186 | 14.9412 | 7.12014 |
| 30.0105 | 3.46263 | 15.7123 | 7.10935 |
| 32.8091 | 3.25743 | 16.4804 | 7.09839 |
| 35.8336 | 3.0466 | 17.2452 | 7.08727 |
| 39.0966 | 2.83049 | 18.0064 | 7.07598 |
| 42.6061 | 2.60942 | 18.7639 | 7.06452 |
| 46.3643 | 2.38369 | 19.5176 | 7.05291 |
| 50.3652 | 2.15357 | 20.267 | 7.04116 |
| 54.5923 | 1.91934 | 21.0122 | 7.02927 |
| 59.0176 | 1.68124 | 21.7528 | 7.01725 |
|  |  | 22.4888 | 7.0051 |
|  |  | 23.2199 | 6.99283 |
|  |  | 23.946 | 6.98042 |
|  |  | 24.6671 | 6.96785 |
|  |  | 25.383 | 6.95509 |
|  |  | 26.094 | 6.94211 |

TABLE 2-continued

| θi | sagX | θi | sagY |
|---|---|---|---|
| | | 26.7999 | 6.92886 |
| | | 27.5009 | 6.91528 |
| | | 28.1971 | 6.9013 |
| | | 28.8889 | 6.88685 |
| | | 29.5762 | 6.87187 |
| | | 30.2595 | 6.85629 |
| | | 30.939 | 6.84004 |
| | | 31.6147 | 6.82307 |
| | | 32.2871 | 6.80532 |
| | | 32.9562 | 6.78676 |
| | | 33.6222 | 6.76736 |
| | | 34.2852 | 6.7471 |
| | | 34.9452 | 6.72598 |
| | | 35.6022 | 6.70401 |
| | | 36.2563 | 6.68121 |
| | | 36.9074 | 6.65758 |
| | | 37.5555 | 6.63315 |
| | | 38.2004 | 6.60793 |
| | | 38.8422 | 6.58194 |
| | | 39.4809 | 6.55518 |
| | | 40.1166 | 6.52762 |
| | | 40.7494 | 6.49926 |
| | | 41.3796 | 6.47003 |
| | | 42.0074 | 6.43988 |
| | | 42.6333 | 6.40872 |
| | | 43.2577 | 6.37647 |
| | | 43.8811 | 6.34303 |
| | | 44.504 | 6.30828 |
| | | 45.1271 | 6.27211 |
| | | 45.7509 | 6.23441 |
| | | 46.3758 | 6.1951 |
| | | 47.0025 | 6.15407 |
| | | 47.6311 | 6.11127 |
| | | 48.2621 | 6.06665 |
| | | 48.8956 | 6.0202 |
| | | 49.5316 | 5.97189 |
| | | 50.1702 | 5.92175 |
| | | 50.8114 | 5.8698 |
| | | 51.455 | 5.81604 |
| | | 52.1012 | 5.7605 |
| | | 52.7498 | 5.70316 |
| | | 53.4014 | 5.64398 |
| | | 54.0561 | 5.58286 |
| | | 54.7149 | 5.51966 |
| | | 55.3787 | 5.45419 |
| | | 56.0487 | 5.38619 |
| | | 56.7265 | 5.31535 |
| | | 57.4138 | 5.24134 |
| | | 58.1124 | 5.1638 |
| | | 58.8243 | 5.08236 |
| | | 59.551 | 4.9967 |
| | | 60.2941 | 4.90653 |
| | | 61.0547 | 4.81164 |
| | | 61.8335 | 4.7119 |
| | | 62.631 | 4.60721 |
| | | 63.4477 | 4.49749 |
| | | 64.2845 | 4.38256 |
| | | 65.1435 | 4.26202 |
| | | 66.0287 | 4.13505 |
| | | 66.9478 | 4.00017 |
| | | 67.9131 | 3.85501 |
| | | 68.9434 | 3.69598 |

Figure 13:
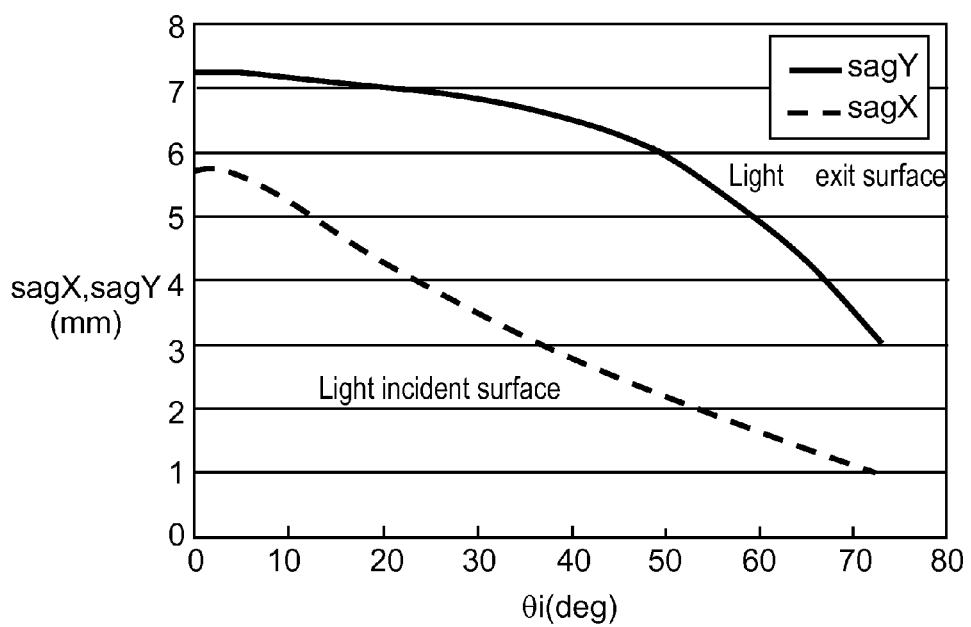
FIG. 13 is a graph showing relations between $\theta i$ and sagX/Y in a lens of Example 2.

FIG. 13 is graphic representation of θi, sagX and sagY of Table 2, showing that sagY monotonously decreases with $sagY_0$ being maximal.

Figure 14:
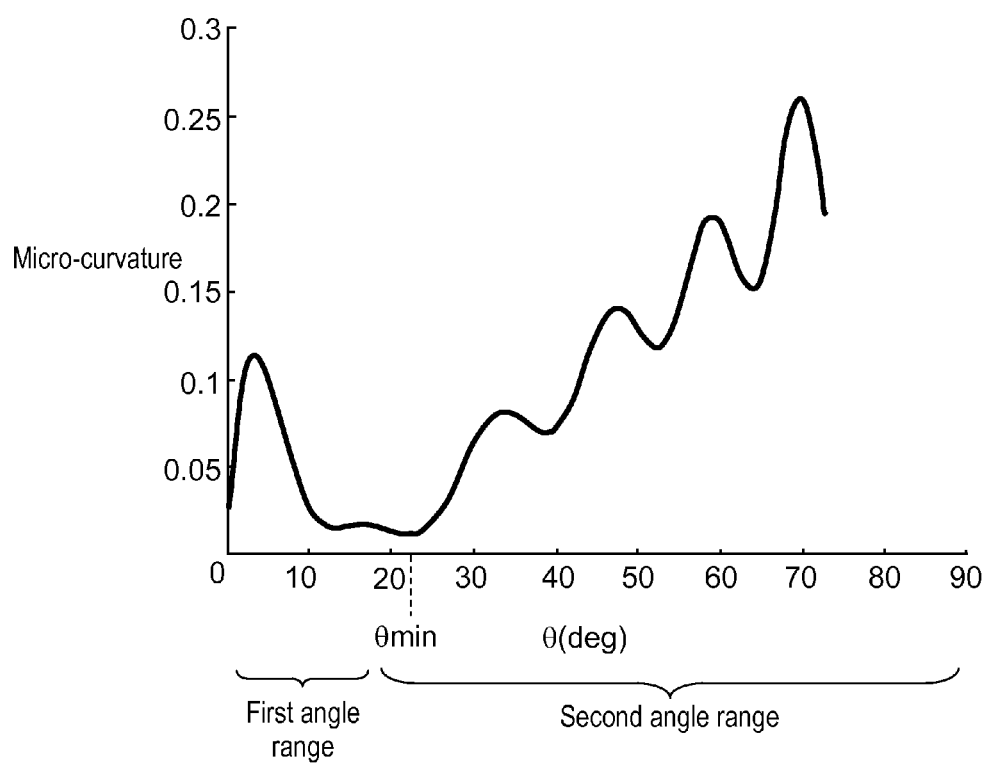
FIG. 14 is a graph showing a relation between $\theta i$ and micro-curvature C in the lens of Example 2.

Further, FIG. 14 is a graph showing a relation between θi and micro-curvature C of the micro-section on light exit surface 12, and shows that θmin of lens 10 in Example 2 is in the range of Formula (1) above. Moreover, the figure shows that curvature C of the micro-section is maximal in a range (second angle range) from θmin to 90°.

Numerical values with respect to the conditions of Formulas (1) to (3) in lens 10 of these Examples 1, 2 are as shown in Table 3.

TABLE 3

| | θ(min) in Formula (1) | D/t in Formula (2) | D/De in Formula (3) |
|---|---|---|---|
| Example 1 | 21.7° | 2.0 | 0.19 |
| Example 2 | 21.8° | 2.0 | 0.15 |

Figure 16:
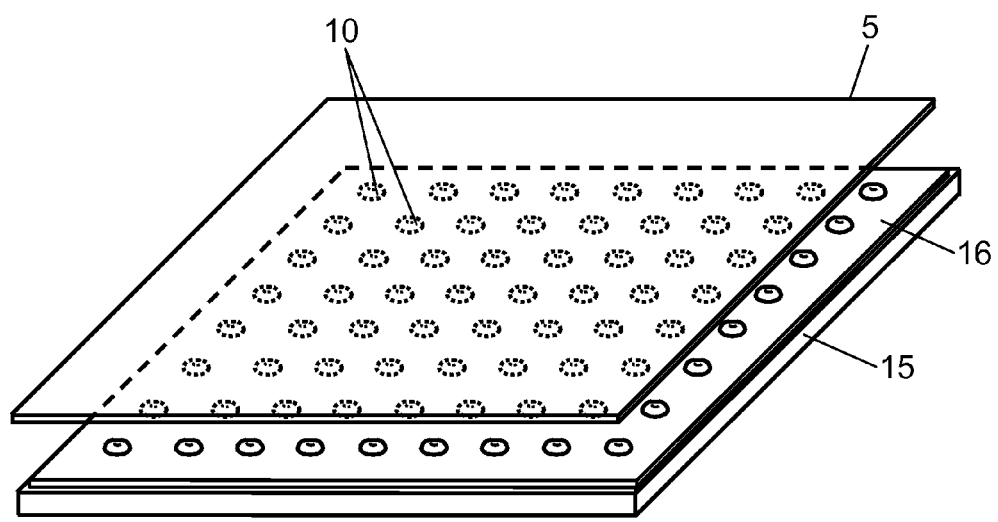
FIG. 16 is a perspective view showing another example of a surface light source device.
Figure 17:
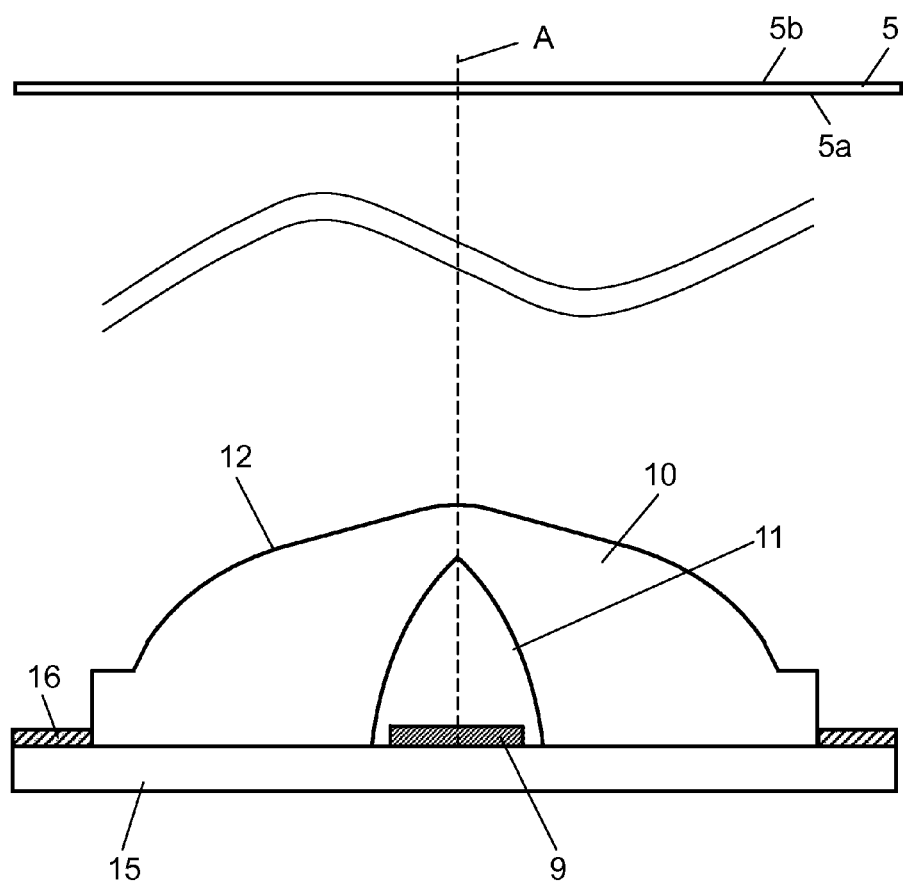
FIG. 17 is a sectional view showing a configuration of a principal part of the surface light source device shown in FIG. 16.

FIG. 16 is a perspective view showing another example of a surface light source device; and FIG. 17 is a sectional view showing a configuration of a principal part thereof. Surface light source device 2 shown in FIGS. 16, 17 is one where plural light sources each provided with light emitting diode 9 and lens 10 are arranged so as to be uniformly scattered all over the device. It is to be noted that, as shown in FIG. 16, the plural light sources may be arranged in a matrix form, or may be arranged in a staggered form.

Further, surface light source device 2 shown in FIGS. 16, 17 is provided with insulating substrate 15 having a wiring pattern so as to be opposed to diffusion panel 5, and light emitting diode 9 is mounted on that substrate 15, to be electrically connected to a wiring pattern. Moreover, lens 10 is arranged by joining of bottom surface 13 to substrate 15. Furthermore, reflection sheet 16 is arranged on substrate 15 so as to cover substrate 15, except for a portion arranged with lens 10. Herein, bottom surface 13 of lens 10 is not necessarily directly jointed to substrate 15, and may, for example, be joined to substrate 15 via another support member that supports lens 10. In this case, a space is formed between substrate 15 and bottom surface 13 of lens 10, and hence reflection sheet 16 may be arranged in this space.

In FIG. 17, the light source provided with light emitting diode 9 and lens 10 irradiates one surface 5a of diffusion panel 5 with light. Diffusion panel 5 emits light in a state where the light with which one surface 5a has been irradiated is diffused from the other surface 5b. Further, the light from the light source is dispersed on diffusion panel 5, and returns to the light source side or passes through diffusion panel 5. The light returned to the light source side is reflected on reflection sheet 16, and is again incident on diffusion panel 5. With repetition of such emission and reflection of light, a sufficient amount of light can be released from the other surface 5b of diffusion panel 5. Moreover, one surface 5a of diffusion panel 5 is irradiated with light having an illuminance uniformed in a broad range from each of the individual light sources, and this light is diffused on diffusion panel 5, whereby it is possible to form a surface light source having little brightness nonuniformity within the surface thereof.

Industrial Applicability

As thus described, the present invention is a useful invention in providing a surface light source device with sufficient brightness.

| REFERENCE MARKS IN THE DRAWINGS | |
|---|---|
| 1 | liquid crystal display panel |
| 2 | surface light source |
| 3 | light source section |
| 4 | housing |
| 5 | diffusion panel |
| 6 | reflection sheet |
| 7 | optical sheet laminated body |
| 8 | substrate |
| 9 | light emitting diode |
| 10 | lens |
| 11 | light incident surface |
| 12 | light exit surface |

-continued

REFERENCE MARKS IN THE DRAWINGS

| 13 | bottom surface |
|---|---|
| 14 | ring section |
| 15 | substrate |
| 16 | reflection sheet |

The invention claimed is:

1. A surface light source, comprising a light source section including a plurality of light emitting elements, each of the light emitting elements including a light emitting diode (LED) and a lens and having an optical axis extending from the LED through a center of the lens, wherein:
the lens has a light incident surface on which light from the LED is incident, and a light exit surface that expands the incident light,
the light incident surface has a continued depressed surface, and the light exit surface has a continued projected surface,
a height of the lens has a maximum value at the center of the lens and decreases from the maximum value away from the center of the lens,
an angle θ is defined as an angle formed by the optical axis and a line connecting the LED and a point of the light exit surface, and
the light exit surface is configured such that in an area where θ is 2 degrees or more,
a curvature of the light exit surface has a minimum at a first point having a corresponding angle θmin and a maximum at a second point,
the first point exists at a first area of the light exit surface that satisfies 10 degrees <θ<30 degrees, and
the curvature changes from decreasing to increasing within the first area.

2. The surface light source device according to claim 1, wherein
the second point exists at a second area of the light exit surface that satisfies 2 degrees<θ<θmin.

3. The surface light source device according to claim 1, wherein
the second point exists at a second area of the light exit surface that satisfies θmin<θ<90°.

4. The surface light source device according to claim 1, wherein
a central portion of the light exit surface of the lens has a curvature of substantially zero.

5. The surface light source device according to claim 1, wherein the lens takes a shape satisfying a relation of 0.3<D/t<3.0,
where "D" is a maximum width of a light emitting surface of the light emitting diode; and
"t" is a thickness of the center of the lens.

6. The surface light source device according to claim 1, wherein
the lens takes a shape satisfying a relation of 0.03<D/De<0.3,
where "D" is a maximum width of a light emitting surface of the light emitting diode; and
"De" is an effective radius of the lens.

7. The surface light source device according to claim 1, further comprising:
a housing that accommodates the light source section;
a diffusion panel that covers an opening of the housing; and
a reflection sheet that reflects the emitted light from the light source section to the diffusion panel, wherein
the plurality of light emitting elements are arranged in a central section of the light source section.

8. The surface light source device according to claim 1, wherein
the plurality of light emitting elements are arranged with narrower intervals in a central section of the light source section than in another section of the light source section.

9. The surface light source device according to claim 1, wherein
the plurality of light emitting elements are arranged with narrower intervals in a central section and a peripheral section of the light source section than in another section of the light source section.

10. The surface light source device according to claim 1, wherein
a value of minimum curvature at the first point is smaller than 0.

11. A liquid crystal display device, comprising:
a liquid crystal display panel; and
a surface light source device that is arranged on a back of the liquid crystal display panel and has a size corresponding to the liquid crystal display panel, and
in which the surface light source device includes:
a light source section including of plural light emitting elements, each of the light emitting elements including a light emitting diode (LED) and a lens and having an optical axis extending from the LED through a center of the lens,
a housing that accommodates the light source section,
a diffusion panel arranged between the liquid crystal display panel and the light source section, and
a reflection sheet that reflects the emitted light from the light source section to the diffusion panel, wherein
the plural lenses are arranged on a center of the light source section,
the lens has a light incident surface on which light from the LED is incident, and a light exit surface that expands the incident light,
the light incident surface has a continued depressed surface, and the light exit surface has a continued projected surface,
a height of the lens has a maximum value at the center of the lens and decreases from the maximum value away from the center of the lens,
an angle θ is defined as an angle formed by the optical axis and a line connecting the LED and a point of the light exit surface, and
the light exit surface is configured such that in an area where θ is 2 degrees or more,
a curvature of the light exit surface has a minimum at a first point having a corresponding angle θmin and a maximum at a second point,
the first point exists at a first area of the light exit surface that satisfies 10 degrees <θ<30 degrees, and
the curvature changes from decreasing to increasing within the first area.

12. A lens that expands light from a light emitting diode (LED), wherein
the lens has a light incident surface on which light from LED is incident, and a light exit surface that expands the incident light,
the light incident surface has a continued depressed surface, and the light exit surface has a continued projected surface, the lens is formed such that a distance from the base point to the light exit surface is maximum at the center of the lens and decreases from the maximum value away from the center of the lens, a height of the lens has a maximum value at the center of the lens and decreases from the maximum value away from the center of the lens, an angle θ is defined as an angle formed by the optical axis and a line connecting the LED and a point of the light exit surface, and the light exit surface is configured such that in an area where θ is 2 degrees or more, a curvature of the light exit surface has a minimum at a first point having a corresponding angle θmin and a maximum at a second point, the first point exists at a first area of the light exit surface that satisfies 10 degrees <θ<30 degrees, and the curvature changes from decreasing to increasing within the first area.

13. The lens according to claim 12, wherein
the second point exists at a second area of the light exit surface that satisfies 2 degrees<θ<θmin.

14. The lens according to claim 12, wherein
the second point exists at a second area of the light exit surface that satisfies θmin<θ<90°.

15. The lens according to claim 12, wherein
a central portion of the light exit surface has a curvature of substantially zero.

16. The lens according to claim 12, wherein
the lens takes a shape satisfying a relation of 0.3<D/t<3.0,
where "D" is a maximum width of a light emitting surface of the light emitting diode; and
"t" is a thickness of the center of the lens.

17. The lens according to claim 12, wherein
the lens takes a shape satisfying a relation of 0.03<D/De<0.3,
where "D" is a maximum width of a light emitting surface of the light emitting diode; and
"De" is an effective radius of the lens.

* * * * *